United States Patent [19]

Spence

[11] Patent Number: 4,606,229

[45] Date of Patent: Aug. 19, 1986

[54] DIFFERENTIAL PRESSURE TRANSMITTER

[75] Inventor: Scott L. Spence, Goshen, Ind.

[73] Assignee: Johnson Service Company, Milwaukee, Wis.

[21] Appl. No.: 718,745

[22] Filed: Apr. 1, 1985

[51] Int. Cl.⁴ .......................... G01L 7/08; G01L 9/14; H01L 43/06

[52] U.S. Cl. ...................................... 73/722; 73/728; 338/32 H; 338/42

[58] Field of Search ............... 73/722, 728; 338/32 H, 338/42

[56] References Cited

U.S. PATENT DOCUMENTS

| | | | |
|---|---|---|---|
| 3,956,920 | 5/1976 | Kollmeyer | 338/42 |
| 4,352,085 | 9/1982 | Herden | 338/42 |
| 4,484,173 | 11/1984 | Everett | 338/42 |
| 4,512,199 | 4/1985 | Woodward | 338/42 |

Primary Examiner—Donald O. Woodiel

Attorney, Agent, or Firm—Larry L. Shupe; Joseph J. Jochman, Jr.; John Phillip Ryan

[57] ABSTRACT

A differential pressure transmitter includes a housing, a first chamber within the housing for receiving an input pressure to be sensed and a second chamber for receiving a transmitter adapted to generate an electrical signal representative of the input pressure. The chambers are separated by a continuously formed, highly resilient diaphragm. A reaction member embodied as a resilient spring is disposed in the second chamber for sensing a position of the diaphragm resulting from the magnitude of the differential pressure thereacross. The reaction member has a magnetized structure mounted thereon which coacts with a Hall effect transducer embodied in the transmitter for detecting the relative position of the magnetized structure and therefore of the diaphragm and responsively generating an electrical signal. The signal may be utilized for positioning actuator controlled dampers within a VAV system duct.

7 Claims, 11 Drawing Figures

DIFFERENTIAL PRESSURE TRANSMITTER

This invention relates generally to devices for providing an electrical signal representative of a pressure, commonly termed pressure-to-electric transducers, and more particularly, to a pressure transmitter using the Hall effect phenomenon for providing an electrical signal as a representation of the difference between two pressures.

While variations of the invention disclosed and claimed herein may be adapted to a wide variety of pressure transducing applications, the preferred embodiment is particularly useful with variable air volume delivery systems as are found in heating, ventilating and air conditioning (HVAC) applications. Heretofore, HVAC systems have employed constant volume air handling units including ducts which deliver air to a space or room, the temperature of which is to be controlled. In a constant volume system, temperature control is by manipulating the temperature of the air passing through a duct while maintaining the quantity of air delivered to the space at a substantially constant value. More recently, it has been found that variable air volume (VAV) systems are preferred in that they may be made more energy efficient. In systems of the latter type, control of the space temperature is by maintaining the temperature of the air at a relatively constant value and increasing or decreasing the volume of air passing through the duct. Therefore, one of the parameters required to be available to the HVAC control system is the air pressure within the duct. This is so since if the duct internal pressure is known, a computation can be made in a known manner which will permit the determination of the volume and therefore, the BTU content of the air flowing therethrough. In a typical VAV system, the differential pressure between ambient and that within the duct is quite low, normally on the order of 1-3 inches water gauge, over the useful range of air volumes which the VAV system can deliver.

While devices are presently available for determining this differential pressure, they tend to be of instrument quality, characterized by unnecessarily high accuracy, typically fractions of one percent, and are therefore undesirably high in cost considering the requirements of the application.

One approach to the design of a pressure sensing Hall effect apparatus is shown in U.S. Letters Pat. No. 4,484,173. Disclosed therein is a three chamber device which incorporates a movable diaphragm to divide the first and second chambers. The diaphragm is movable in response to the differential pressure thereacross, the movement being transmitted from the second chamber to a third chamber and to a mechanism housed within the latter. The transfer of diaphragm movement is by a rigid reaction member embodied as an elongate actuating pin slidably disposed in a tube extending between the second and third chambers. Movement of the actuating pin causes a positional change in the magnet assembly and therefore in the electrical output of the Hall transducer. No electrical circuitry is disclosed nor is it apparent whether the device is intended to function as an analog or digital output device. A disadvantage of a construction of this type is that use of the slidable pin and the multiple component mechanism introduces an undesirably high degree of sliding friction which will likely result in an impairment of the quality of the pressure-representing signal which may be available therefrom. Further, the device of the aforementioned patent employs a pair of cylindrical magnets mounted on a coextensive longitudinal axis and in face opposing relationship one to the other. The magnets are movably displaced along this axis to affect the Hall sensor, a technique which results in a less linear output than that of the invention. Additionally, the device is unnecessarily complex in its construction.

A pressure transmitter which is suitable for the detection of very low differential pressures, which can be made in an economical construction, which provides a generally linear, electrical analog output signal representative of such pressures and which avoids sliding friction which may impair signal quality would be a distinct advance in the art.

SUMMARY OF THE INVENTION

In general, the inventive differential pressure transmitter includes a housing, a first chamber within the housing for receiving an input pressure to be sensed and a second chamber for receiving a transmitter adapted to generate an electrical signal representative of the input pressure. The chambers are separated by a continuously formed, highly resilient diaphragm. A reaction member embodied as a resilient spring is disposed in the second chamber for sensing a position of the diaphragm resulting from the magnitude of the differential pressure thereacross. The reaction member has a magnetized structure mounted thereon which coacts with a Hall effect transducer embodied in the transmitter for detecting the relative position of the magnetized structure and therefore of the diaphragm and responsively generating an electrical signal. The signal may be utilized for positioning actuator controlled dampers within a VAV system duct.

An object of the present invention is to provide a low cost differential pressure transmitter.

Yet another object of the present invention is to provide a low cost transmitter capable of providing electrical signals which are analogous to and representative of very small differentials in pressure.

Still another object of the present invention is to provide a differential pressure transmitter useful on variable air volume control systems.

Yet another object of the present invention is to provide a differential pressure transmitter having two chambers isolated one from the other by a continuously formed diaphragm, thereby avoiding interchamber air leakage. How these and other objects of the invention are accomplished will become more apparent from the detailed description thereof taken in conjunction with the drawing.

DESCRIPTION OF A PREFERRED EMBODIMENT

Figure 1:
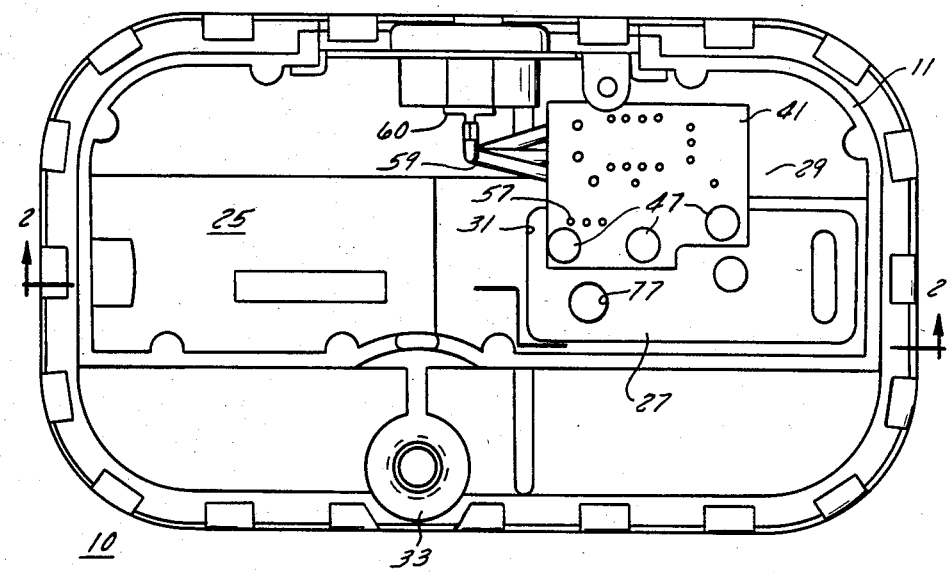
FIG. 1 is a top plan view of the transmitter of the present invention and with cover removed to better show interior arrangement.
Figure 2:
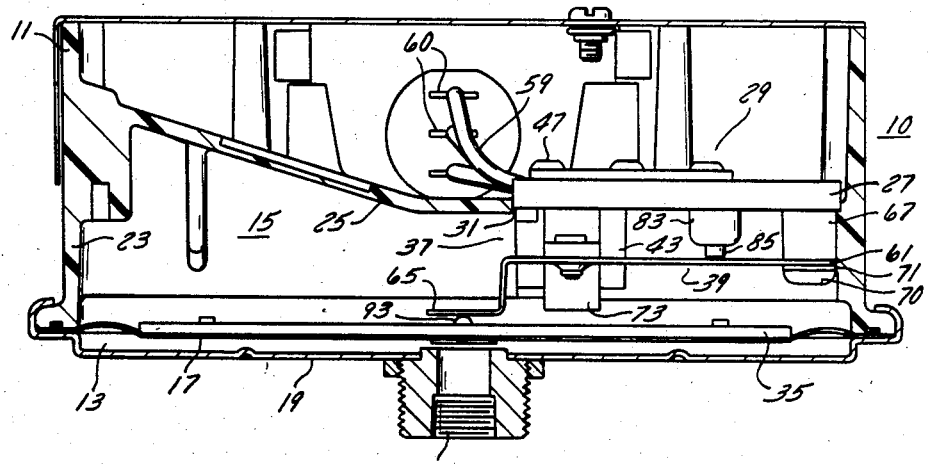
FIG. 2 is a cross-sectional side elevation view of the transmitter taken generally along the planes 2—2 of FIG. 1 and with cover in place.
Figure 3:
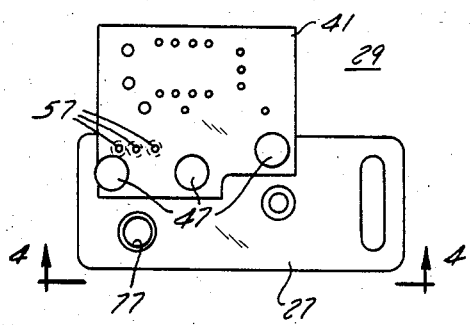
FIG. 3 is a top plan view of the support base and circuit board assembly of the transmitter as also seen in FIG. 1.

Referring first to FIGS. 1 and 2, the differential pressure transmitter 10 of the present invention is shown to include a housing 11 conveniently molded of a rigid plastic and divided to a first chamber 13 and a second chamber 15 by a highly resilient, continuously formed diaphragm 17 movable in response to the differential pressure thereacross. The first chamber 13 has an outer, rigid wall member 19 which incorporates a first threaded port 21 in fluid flow communication with the first chamber 13 and useful for connection to an external pneumatic conductor. The second chamber 15 is defined by the diaphragm 17, by the housing sidewall 23, by a contiguously molded rib 25 and by the support base 27 of a transmitter 29 which sealingly closes an opening 31 in the rib 25 and which is described in detail hereafter. The second chamber 15 is thereby sealed except for a second port 33 formed to be in fluid flow communication therewith. When used to detect a pressure which is positive with respect to the ambient, common for VAV systems, the first port 21 is coupled to the interior of the duct, the pressure of which is to be sensed, and the second port 33 connected to a region of ambient pressure. In the alternative and if it is desired to employ the transmitter 10 as a vacuum differential device, the second port 33 is connected to a source of vacuum and the first port 21 to a region of ambient pressure. Certain details of construction including those related to the diaphragm 17 and the rigid follower plate 35 disposed thereon are shown in U.S. Pat. No. 4,467,998 titled "High Gain Pneumatic Switch". The aforementioned patent is incorporated herein by reference.

Referring next to FIGS. 1, 2, 3 and 4, a signal generator 37 is received within the housing 11 and includes a transmitter 29 for providing an electrical output signal and a reaction member 39 for movably interfacing between the diaphragm 17 and the transmitter 29. The transmitter 29 includes a support base 27, a printed circuit board 41 mounted on the support base 27 for receiving certain electronic circuitry and a downwardly projecting beam 43 for supporting a Hall effect transducer 45 connected to the printed circuit board 41. As best seen in FIG. 1, the base 27 may be supported within the housing 11 by affixing it to the perimeter of the rib opening 31 using adhesive for the purpose. The circuit board 41 may be attached to the support base 27 using heat deformed plastic studs 47 or snap-on fasteners. Attachment by fastener or heat rather than ultrasonic welding is preferred since the latter may damage the electronic circuitry.

Figures 6, 7:
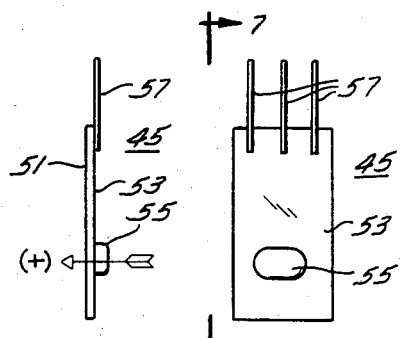
FIG. 6 is a side elevation view of an exemplary Hall effect transducer useful in the transmitter of the invention.
FIG. 7 is an edge elevation view of the transducer of FIG. 6 viewed along the axis 7—7 thereof.
Figure 5:
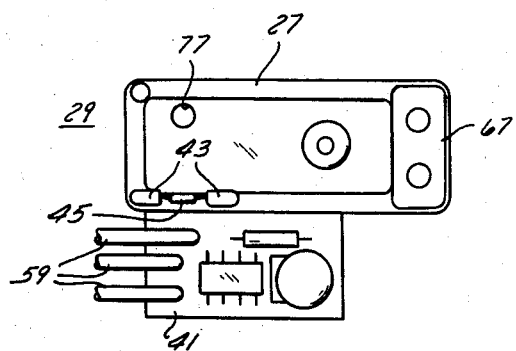
FIG. 5 is a bottom plan view of the assembly of FIGS. 3 and 4 and taken along the plane 5—5 of FIG. 4.

Referring next to FIGS. 1, 5, 6 and 7, the Hall effect transducer 45 is mounted within the support beam 43 to be in a spaced apart but yet magnetic field sensing relationship to the magnetized structure 49 of the reaction member 39, the latter being described in detail hereinafter. In the apparatus 10 of the exemplary embodiment, a satisfactory transducer 45 is available from Microswitch, part number 93SS12-2 as shown on product sheet 9SS attached hereto as Appendix 1. As best seen in FIGS. 5, 6 and 7, the transducer 45 has a first planar face 51 to be located adjacent the magnetized structure 49 and a second face 53 on which is disposed the sensing element 55. As shown in FIGS. 1 and 6, the lead wires 57 of the transducer 45 may be connected to the circuit board 41 using wiring holes for the purpose. Circuit board wiring may be brought to the side wall 23 of the housing 11 using lead wires 59 and clips 60 for the purpose.

Figure 4:
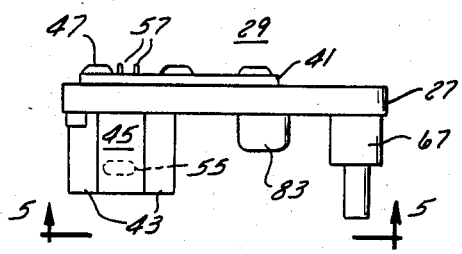
FIG. 4 is a side elevation view of the assembly of FIG. 3 taken along the plane 4—4 thereof.
Figure 8:
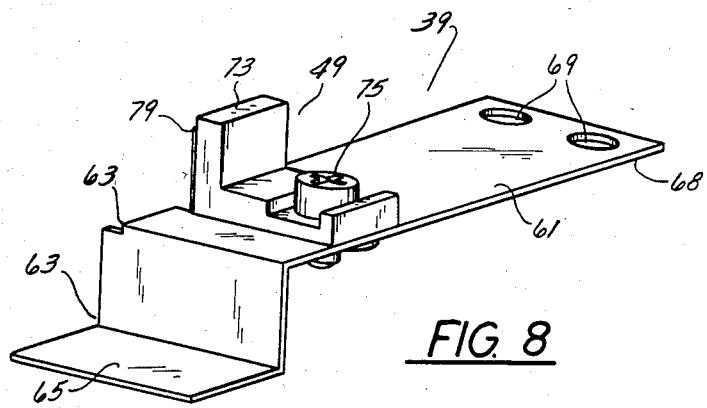
FIG. 8 is an isometric view of the reaction member which comprises a component of the invention.

Referring to FIGS. 2, 4 and 8, a resilient reaction member 39 embodied as a cantilever leaf spring is disposed between the diaphragm 17 and the transmitter 29 and has an arm 61, a pair of right angularly formed bends 63 and a foot member 65 to be in contact with and sense the movement of the diaphragm plate 35. The reaction member 39 may be attached to the base 27 using downwardly projecting studs 67 which are in registry with a pair of mounting holes 69 formed in the first end 68 of the arm 61. If a plastic support base 27 and studs 67 are employed, attachment may be by ultrasonic welding to form a mushroom head 70 or by snap-on fastener. A small bearing plate 71 may advantageously be disposed between the first end 68 and the heads 70.

Figure 9:
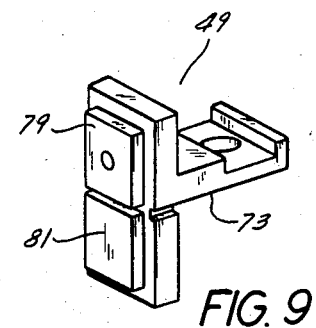
FIG. 9 is an isometric view of a magnetized structure which comprises a component of the member of FIG. 8.

Referring next to FIGS. 1, 8 and 9, the arm 61 of the reaction member 39 has disposed thereon a magnetized structure 49 including a generally T-shaped nonferrous holder 73. Attachment of the holder 73 to the arm 61 is preferably by an eccentric mounting screw 75, the slight rotational adjustment of which will cause the holder 73 to be moved laterally back and forth across the reaction member 39 in an axis of movement normal to the long axis of the member 39. The inclusion of this adjustment feature permits slight modification of the spacing between the magnetized structure 49 and the transducer 45, thereby providing a gain adjustment. Access to the screw 75 may be through a hole 77 in the base 27, the hole 77 to be sealed after adjustment to prevent leakage.

The holder 73 has adhesively attached thereto a pair of relatively thin permanent magnets 79, 81, each having a planar, generally square face. In the exemplary embodiment, the upper magnet 79, as viewed in FIG. 9, is disposed on the holder 73 so that its north-polarized surface is outward while the lower magnet 81 is disposed so that its south-polarized face is outward. In the preferred embodiment, the reaction member 39 is embodied as a cantilever beam and the area used to displace the magnetized structure 49 is selected to be intermediate the first end 68 and the foot member 65. It will be apparent that one may reverse the positions of the Hall effect transducer 45 and the magnetized structure 49 by mounting the former upon the reaction member 39 and the latter stationary near the circuit board 41. However, known transducers are mechanically fragile and therefore preferably mounted in a stationary location. Additionally, the necessity of coupling wiring to the transducer 45 may impair the accuracy of the transmitter 10.

Referring to FIGS. 1 and 2, it may be desirable to provide means for zero or offset adjustment of the signal generator 37. Accordingly, the base 27 also includes a downwardly projecting boss 83 into which a screw 85 may be received. The screw 85 may bear upon but is not attached to the reaction member 39 and may be turned downwardly toward the member 39 to provide an increasing mechanical and therefore electrical offset by requiring a greater differential pressure to effect diaphragm movement.

Figure 10:
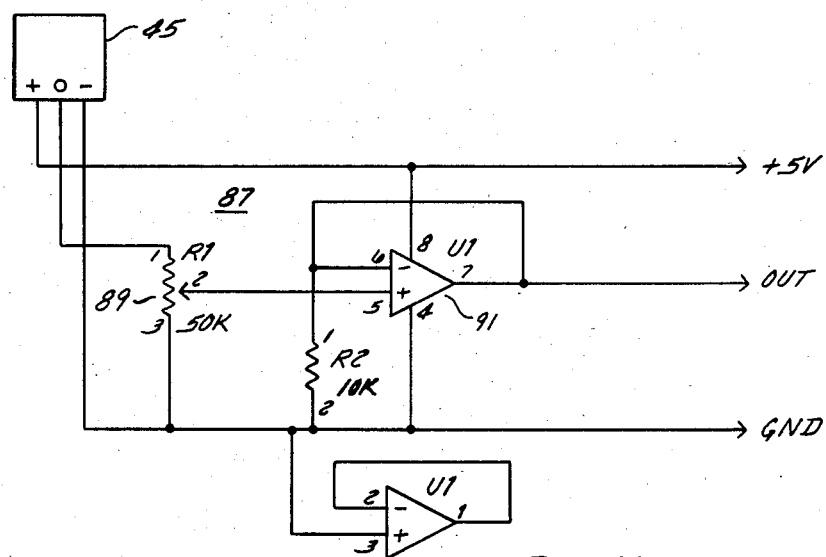
FIG. 10 is a schematic diagram of an electrical circuit useful in the invention.

Referring next to FIGS. 2 and 10, there is shown the transducer 45 and the electronic circuit 87 which may be received and embodied upon the printed circuit board 41. The circuit 87 includes a potentiometer 89 for selecting, if desired, an offset null voltage. That is, certain control devices with which the transmitter 10 may be used may require an output voltage of, for example, 1 VDC with no pressure differential across the diaphragm 17. Similarly, these control devices may require an output voltage of 2 VDC at the maximum differential pressure to be sensed, e.g., 3 inches water gauge. The potentiometer 89 permits this adjustment while the LM358 operational amplifier 91 is used in this circuit 87 as a voltage follower, permitting the matching of the impedance of other devices external to the apparatus 10.

Figure 11:
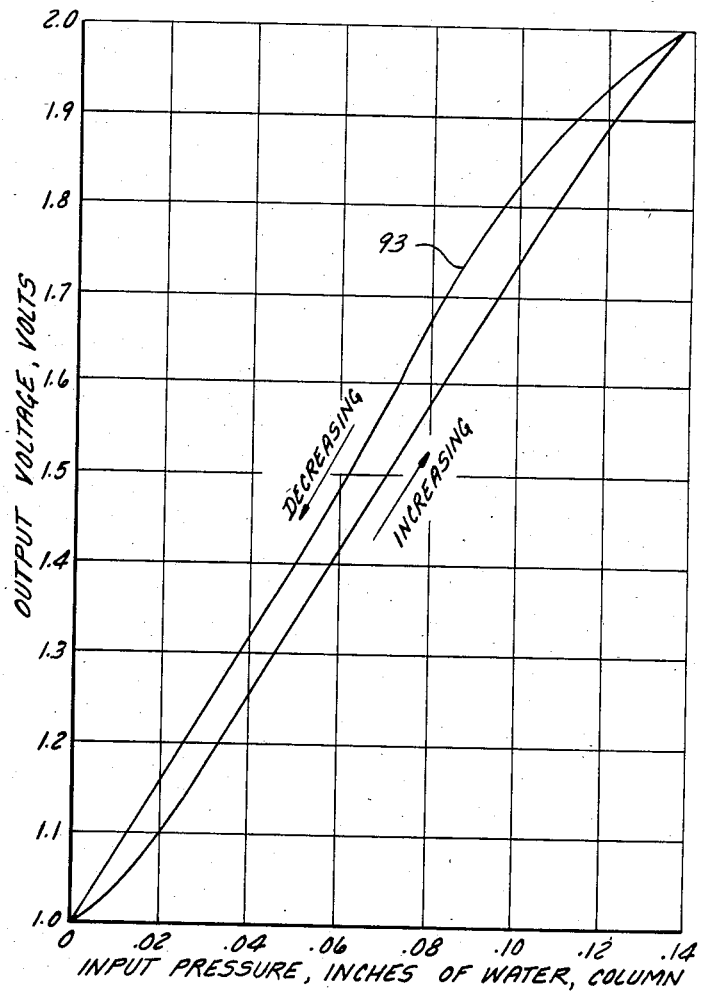
FIG. 11 is an exemplary performance characteristic curve of the invention.

When the transmitter 10 of the present invention is used with a VAV system and air duct for sensing a pressure which is positive therewithin with respect to the ambient, the apparatus 10 is mounted adjacent the system duct and a pneumatic conductor installed between the first port 21 and the duct interior spatial region. D.C. power is thereupon applied to the transmitter 10 and the diaphragm 17 will move to a position corresponding to the differential pressure thereacross. The nose 93 of the diaphragm plate 35, bearing upon the foot 65 of the reaction member 39, will cause a movement upward as seen in FIG. 2 so that the magnetized structure 49 with its magnets 79, 81 are moved to a position with respect to the transducer 45. The resulting transducer electrical output signal will be a voltage representative of the differential pressure across the diaphragm 17 and therefore of the pressure within the duct. A curve 93 representing the performance characteristics of an exemplary apparatus 10 is depicted in FIG. 11 to be generally linear both in the increasing and decreasing pressure directions and the hysteresis is acceptably low. It is apparent from the curve that when pressure is increasing, a circuit output voltage of approximately 1.5 VDC represents a positive duct internal pressure of approximately 0.07 inches of water gauge with respect to ambient. Similarly, when the pressure is decreasing, that same voltage represents a duct interior pressure of approximately 0.06 inches of water. The exemplary embodiment may conveniently be used with microprocessor based direct digital equipment for control of the VAV system and such equipment may be readily configured to distinguish between an increasing and a decreasing output signal from the transmitter 10. In the exemplary embodiment represented by the performance curve 93 of FIG. 11, the reaction member 39 leaf spring was formed of formula 410 stainless steel, had a thickness of about 0.010 inches and a width of about 0.685 inches. It will be apparent after appreciating the teachings of the disclosure that other performance characteristics could be derived by manipulating the configuration of the transmitter components.

While only a single preferred embodiment of the inventive apparatus 10 has been shown and described herein, it is not intended to be limited thereby but only by the scope of the claims which follow.

I claim:
1. A differential pressure transmitter including:
a housing;
a first chamber within said housing for receiving an input pressure, said first chamber being defined by a rigid wall member and a continuously formed, highly resilient diaphragm;
a second chamber within said housing for receiving a transmitter for generating an electrical signal representative of said input pressure, said diaphragm maintaining said first chamber and second chamber in fluid flow isolation one from the other;
a resilient reaction member confined within said second chamber for sensing a position of said diaphragm resulting from the magnitude of said input pressure, said reaction member having a magnetized support structure mounted thereon, said support structure being movable along an axis of movement;
said transmitter including a Hall effect transducer rigidly mounted thereon and laterally displaced from said axis of movement, said transducer detecting the relative position of said structure with respect to said transducer and responsively generating said electrical signal;
said transmitter further including means for adjusting the relative proximity of said support structure and said transducer for providing gain adjustment.

2. The invention set forth in claim 1 wherein said reaction member includes a leaf spring supported at a first end and contacting a diaphragm follower plate at its second end and in substantially frictionless engagement with said plate, said reaction member and said plate coacting with said diaphragm for sensing diaphragm position.

3. The invention set forth in claim 2 wherein said adjusting means includes means for laterally positioning the location of said support structure with respect to the position of said transducer, thereby effecting gain adjustment.

4. A differential pressure transmitter including:
a housing having a first chamber and a second chamber maintained in fluid flow isolation one from the other by a resilient diaphragm;
a signal generator disposed in said housing and including a transmitter and a substantially frictionless reaction member movable coincidentally with said diaphragm;
said reaction member defining a leaf spring disposed generally parallel to said diaphragm, said reaction member having a plurality of generally planar magnets mounted thereon for providing a magnetic field;
said transmitter including a Hall effect transducer having a generally planar surface and mounted in magnetic field sensing, spaced apart relationship to said magnets, said signal generator providing an electrical output signal representative of the pressure in said first chamber.

5. The invention set forth in claim 4 wherein the plane defined by the faces of said magnets and the generally planar surface of said transducer are both generally normal to the plane generally defined by said diaphragm.

6. The invention set forth in claim 5 wherein said electrical output signal is an analog signal having a magnitude generally proportional to said pressure in said first chamber.

7. A differential pressure transmitter including:

a housing;

a first chamber within said housing for receiving an input pressure, said first chamber being defined by a rigid wall member and a continuously formed, highly resilient diaphragm;

a second chamber within said housing for receiving a transmitter for generating an electrical signal representative of said input pressure, said diaphragm maintaining said first chamber and said second chamber in fluid flow isolation one from the other;

a resilient reaction member confined within said second chamber for sensing a position of said diaphragm resulting from the magnitude of said input pressure, said reaction member including a leaf spring supported at a first end and coacting with said diaphragm for sensing the position thereof, said reaction member having a magnetized structure mounted thereon, said magnetized structure including a plurality of generally planar magnets disposed in close juxtaposition one to the other in a generally coplanar attitude;

said transmitter including a Hall effect transducer for detecting the relative position of said structure with respect to said transducer and responsively generating said electrical signal.

* * * * *